(12) United States Patent
Bartholomew et al.

(10) Patent No.: US 6,400,708 B1
(45) Date of Patent: Jun. 4, 2002

(54) D-CHANNEL VOICE COMMUNICATIONS

(75) Inventors: Dale L. Bartholomew, Vienna; Robert D. Farris, Sterling, both of VA (US); Raymond I. Millet, Bowie, MD (US); David D. Hunter, Herndon, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/161,276

(22) Filed: Sep. 28, 1998

(51) Int. Cl.[7] .................................................. H04J 3/12
(52) U.S. Cl. ..................... 370/352; 370/524; 379/93.01
(58) Field of Search ................................. 370/264, 493, 370/495, 477, 522, 524, 529, 535, 536, 537, 352; 379/93.01, 93.05, 93.06, 93.07

(56) References Cited

U.S. PATENT DOCUMENTS

| | | | |
|---|---|---|---|
| 5,442,630 A | | 8/1995 | Gagliardi et al. ............ 370/402 |
| 5,444,703 A | | 8/1995 | Gagliardi et al. ............ 370/401 |
| 5,463,629 A | | 10/1995 | Ko ............................. 370/463 |
| 5,467,353 A | * | 11/1995 | Fukuda |
| 5,479,407 A | | 12/1995 | Ko et al. ..................... 370/231 |
| 5,574,861 A | | 11/1996 | Lorvig et al. ............... 709/226 |
| 5,940,403 A | * | 8/1999 | Williams |
| 6,243,377 B1 | * | 6/2001 | Phillips et al. |

* cited by examiner

*Primary Examiner*—Chau Nguyen
*Assistant Examiner*—Inder Pal Mehra
(74) *Attorney, Agent, or Firm*—Leonard C. Suchyta; Loren Swingle

(57) ABSTRACT

A number of proposals have been developed to provide data communications over two-wire copper circuits at rates equivalent to a number of combined ISDN B-channels. For example, for an ISDN rate digital subscriber line (IDSL), the circuit between the network termination at the customer premises and the channel bank carries data on two combined B-channels. An IDSL circuit cannot carry voice communications. Some such services carry the lower rate signaling D-channel only on the subscriber line circuit. Normal ISDN services carry voice services on one of the two B-channels, limiting data communications to the other B-channel. Normal ISDN services do carry the lower rate D-channel through the network, but this channel is used only for call set-up signaling, low speed data communications and the like. The invention uses two or more B-channels on the DSL circuit for data communications and transports voice telephone communications on the low speed signaling D-channel. The bearer (B) channels typically connect to a high speed data network, such as SMDS, for services such as Internet access. The voice communications on the D-channel utilize in-band call set-up signaling and appropriate CODECs for digital communications compressed to the low D-channel rate. The channel bank includes a multiplexer/demultiplexer to combine four active D-channels voice communications into one DS0 for transport to a switch module, for example, in an end office telephone switch.

23 Claims, 3 Drawing Sheets

D-CHANNEL VOICE COMMUNICATIONS

TECHNICAL FIELD

The present invention relates to a technique for providing relatively normal voice-grade telephone communications over the signaling data (D) channel of a digital subscriber line, while essentially all of the bearer (B) channel capacity is engaged for other communications, particularly data services.

BACKGROUND

Modern society continues to create exponentially increasing demands for digital information, and the communication of such information creates increasing needs for ever faster data communication speeds.

The most common form of computer-to-computer data communication in use today relies on modems and analog telephone connections. Such modems communicate data as modulated audio signals, within the voice bandwidth of the telephone network. The various elements of the telephone network treat these voice frequency signals exactly like voice type analog audio signals. This telephone-based operation provides the voice grade analog modem a unique power, the necessary connections are virtually ubiquitous. Such modems can communicate via virtually any telephone line or wireless telephone (e.g. cellular) to any other such telephone link, virtually anywhere in the world.

However, the design of the existing telephone network optimizes efficiency for communication of voice information, and as a result, places severe limitations on the capacity of modem communications. Also, use of a modem on a subscriber's line prohibits use thereof for normal voice communications for the duration of the data session. To have voice communication capability at the same time as the data communication, the subscriber must pay for a second telephone line to the customer's premises.

Integrated Services Digital Network (ISDN) offers faster data communications and the capacity for concurrent data and voice telephone services. For ISDN service, a user obtains a digital subscriber line (DSL) termination unit connected to the customer premises end of a telephone line. The basic rate interface (BRI) DSL terminal unit provides duplex 160 kb/s digital communication with corresponding elements in the telephone network. The 160 kb/s capacity carries two bearer (B) channels, each at 64 kb/s, one data (D) channel at 16 kb/s and overhead information contained in a 16 kb/s embedded operations channel (EOC).

The telephone network switches the B-channels through the network, using 64 kb/s synchronous time slots, in much the same way that it switches plain old telephone service (POTS) calls. B-channel data calls, however, may be switched through as end-to-end digital communications at the full 64 kb/s rate because now the digital channel rate matches the channel rate defined by the time slot interchange units within the telephone switch fabric. There are no conversions between analog and digital content within the network.

The B-channels may be used separately, for example, for one voice telephone call and one data communication. Some applications also allow aggregation of the channels, to combine the B-channels to provide data communications up to the combined rate of 128 kb/s, when there is no concurrent telephone usage. If the data application utilizes both B-channels, there is no capacity for a concurrent voice call over the same line.

ISDN Digital Subscriber Line (IDSL) is a leased line type service, which uses the 2B1Q line-coding standard for ISDN BRI circuits for data-only applications. Essentially, the two B-channels are combined and dedicated to the data service. Consequently, IDSL operates at 128 kb/s. IDSL provides this higher speed data service for line lengths up to 18,000 feet without a repeater or greater distances with ISDN repeaters, the same as standard 2B+D ISDN.

Because IDSL uses the standard ISDN line coding, customers with standard basic rate interface (BRI) type terminal adapters can use their current adapters (in a leased line mode) together with any associated equipment, for connecting to ISDL lines. At the network end of the line, the ISDL line terminates on a line card in a channel bank of a carrier system. However, instead of coupling the B-channels to a time slot interchange unit for switching in the same manner as ISDN, the carrier system connects the customer's B-channels over two slots on a dedicated transport to a desired data point. Typically, these channels connect to a high-speed backbone network, such as a Frame Relay network, a super multi-mega-bit data service (SMDS) network or an asynchronous transfer mode (ATM) network. The link from the customer premises to the backbone network is a dedicated or "nailed-up" connection. The backbone network, however, provides fast packet-switched access to data communication services. In this manner, IDSL lines can provide dedicated access to the particular fast packet backbone network and through that network to the Internet, to private networks, or the like.

With the IDSL service, all communications on the subscriber's line are dedicated to the data service. There is no available bearer capacity for any voice communication. To execute voice communications, the subscriber again must pay for an extra line from the telephone network to the customer's premises.

A need therefore exists for an efficient technique to provide voice telephone communications over a digital subscriber line, particularly an ISDN line or IDSL line, when all of the bearer channel capacity is engaged in data communications. The additional voice capacity should require little or no modification of various network components along the subscriber line or other embedded loop plant facilities. The technique also should be readily adaptable to other types of digital subscriber line services.

SUMMARY OF THE INVENTION

The present invention addresses the above stated needs by enabling voice communication over the signaling data channel of a digital subscriber line, during communication applications that utilize the full bearer channel capacity of the line. The channel banks of a carrier system pass the bearer channel communications through in the normal manner. However, the channel bank multiplexes a number of the data channels together for communication thereof to and from a central office facility.

There have been suggestions to send voice over the D-channel of ISDN, but those have involved virtual channels and packet voice applications. The D-channel has not been used as an alternate logical path over the subscriber line to provide a voice link to an otherwise standard telephone switch nor has there been any multiplexing of D-channel voice signals for transport in a bearer channel through a carrier system.

The use of the D-channel for voice communications enables telephone service over a circuit that otherwise would not support such service, eliminating the need for the customer to buy another line for telephone traffic. The multiplexing of the low-speed D-channels enables the system to provide normal telephone service to two or more active users, while utilizing only one bearer channel or its equivalent through the carrier system. This clearly provides a more efficient utilization of the channel capacity of that system.

Thus, in one aspect, the present invention relates to a method of communicating voice-grade telephone information over a digital subscriber line. The digital subscriber line supports bearer capacity assigned to communications other than the voice-grade telephone communication. For example, the entire bearer capacity may be engaged in a data communication session. The digital subscriber line also supports a lower-speed signaling data channel. In the preferred embodiments, the bearer capacity corresponds to ISDN B-channels, and the signaling channel is an ISDN D-channel.

This communication method involves compressing the voice telephone information to the lower-speed, i.e. to the speed of the signaling channel. The compressed information is communicated over the line within the signaling data channel. The method also involves multiplexing the signaling data channel with information from at least one other signaling data channel for another subscriber line, to form multiplexed data. In the preferred embodiments, voice grade telephone data from up to four ISDN D-channels are transported in one stream multiplexed together at the B-channel or DS0 rate. The multiplexed data is transported between a channel bank coupled to the line and a switch. The compressed information of the original D-channel from the line is segregated from the multiplexed data and coupled with a voice telephone link extending through the switch to a distant telephone station. In one preferred embodiment, the D-channel streams, separated out from the multiplexed transport stream, connect to line ports of a central office telephone switch. The switch provides normal telephone service connections through the public switched telephone network.

Another aspect of the invention relates to a communication network enabling the multiplexed D-channel transport between the subscriber line and the switch that provides the telephone services. Broadly, the network comprises a transport fabric including the switch, a digital subscriber line running from a customer premises to an edge of the transport fabric, a line card for connection to the digital subscriber line at the edge of the transport fabric and a multiplexer. The line card provides throughput between a communication channel assigned to the digital subscriber line in the transport fabric and the bearer communication channel on the digital subscriber line. A multiplexer, coupled to the line card, communicates voice-grade telephone information via the D channel on the digital subscriber line and couples the D-channel and at least one other D-channel through another of the communication channels of the transport fabric of the network to the switch.

A further aspect of the invention relates to a carrier system enabling the D-channel telephone service. The system includes two channel banks and a high-speed link, such as a T1, interconnecting the channel banks.

The first channel bank comprises a line card for connection to the digital subscriber line. The line card supports a bearer communication channel and a logically separate signaling data (D) channel on the digital subscriber line. The line card provides throughput between the bearer communication channel and a first assigned communication channel on the high-speed link. The line card also has a coupling for the D channel. The first channel bank also includes a multiplexer coupled to the D channel coupling of the line card. This element of the card enables multiplexing and demultiplexing for transport of the D channel information together with other D channel information in a second assigned communication channel on the high speed link.

The second channel bank passes the first assigned channel with the bearer content between the high speed link and a port for connection to a data communications switch. In addition, the second channel bank comprises another multiplexer. This multiplexer is coupled to the second assigned channel within the high-speed link. An interface couples the D-channel information between the multiplexer in the second channel bank and a switch for voice-grade telephone service.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PREFERRED EMBODIMENTS

In accord with the preferred embodiments of the present invention, a digital subscriber line (DSL) provides a predetermined bearer channel capacity, for example two or more B-channels. All of the B-channel capacity is utilized or reserved for non-telephone service, typically data communications. The DSL circuit transports voice telephone communications on the low-speed signaling data channel, e.g. on the D-channel. The bearer channel capacity typically connects to a high-speed data network, for services such as Internet access or communications to private networks (intranets). The voice communications on the signaling channel utilize in-band call set-up signaling and appropriate CODECs for digital communications compressed to the low signaling-channel rate. A channel bank on the network edge includes a multiplexer/demultiplexer, to combine a number of active signaling channel voice communications into one bearer channel for transport to a switch module, for example, through a DS0 to a module in an end office telephone switch.

Figure 1:
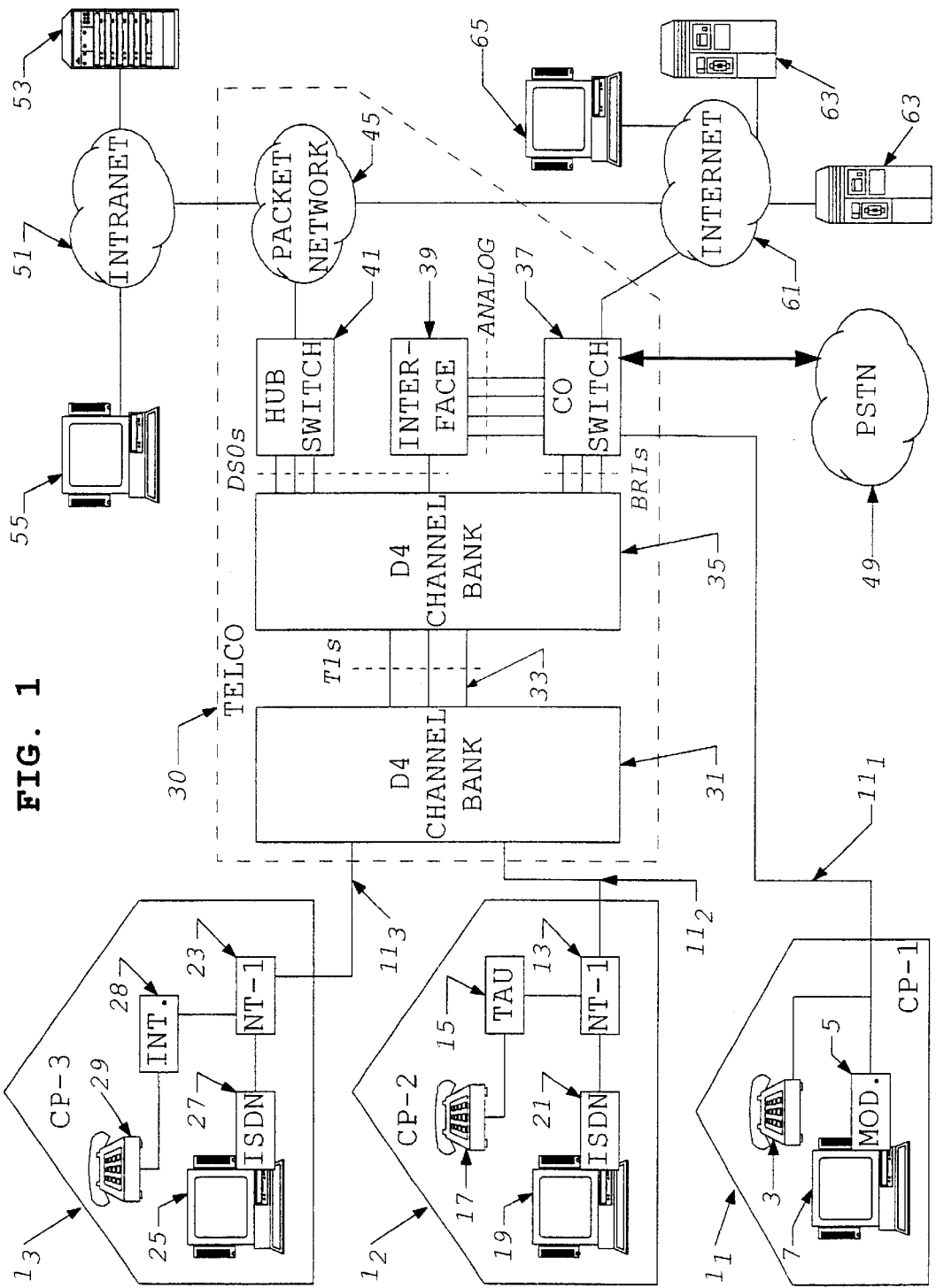
FIG. 1 is a functional block diagram of a portion of a communication system implementing the D-channel voice communications of the present invention.

In practice, the network provides standard telephone service and normal ISDN service to many customers. The D-channel voice communications have particular utility where the customer subscribes to an IDSL or other dedicated data service. However, the inventive voice service also may be used for ISDN customers who routinely use both B-channels at the same time (e.g. for data applications) but still occasionally want to make a concurrent voice call. To fully appreciate the concepts of the present invention, it may be helpful first to consider the structure of an overall communication network providing these various types of voice and data communications. FIG. 1 depicts one such network in simplified form.

FIG. 1 shows three exemplary customer premises (CP) 1, which receives voice and data communication services from a telephone company (TELCO) network 30. Each customer premises receives service over a telephone line 11. Typically, at least the final drop cable to the customer premises, in each line 11, uses twisted-pair copper wiring.

The most common form of service today is that provided to the first customer premises CP-1. At the CP-1 premises $1_1$, the customer has one or more analog telephones 3 connected through customer premises telephone wiring to the telephone line $11_1$. The line runs to a central office (CO) telephone switch 37, in the TELCO network 30. The switch 37 provides voice-grade analog communications service over the line $11_1$ to the premises $1_1$. Many such lines connect directly to a central office. However, those skilled in the art will recognize that a variety of loop carrier systems may be used between the premises $1_1$ and the switch 37, to extend the distance of service from the switch and/or to provide pair gain for the carrier operations. The telephone 3 enables persons at location $1_1$ to dial outgoing telephone calls and answer incoming telephone calls.

The customer at location $1_1$ also may occasionally conduct data communication via the voice-grade telephone service through line $11_1$ and telephone switch 37. For data communications, the customer uses a modem 5 connected directly to the line $11_1$ and a personal computer (PC) 7 coupled to or incorporating the modem. The modem 5 modulates data from the PC 7 and transmits the modulated signal in the voice telephone band over the telephone line $11_1$. The modem 5 receives modulated voice-frequency signals via the line $11_1$, demodulates the received signals and supplies the data to the PC 7. In this way, the analog telephone modem 5 at the premises $1_1$ transmits and receives signals over the line and through the telephone switch 37 to and from another similar line and modem, for example operated by an Internet Service Provider or "ISP" (not shown), who offers access to the Internet 61.

To all of the customer's equipment, the line $11_1$ provides the appearances of a two-wire analog DC loop, with plain old telephone service (POTS) features. Of particular note, the network offers bandwidth usable over such a line that typically is somewhat less than 4000 Hz. This is the maximum available bandwidth, both for voice calls to and from the telephone 3 and for data communications for the PC 7 and modem 5.

In the switch 37, the line $11_1$ terminates on a line card. The line card provides the necessary conversions between analog and digital signal formats and an interface for the digital signals to the time slot interchange switch fabric of the switch 37. The digital format used provides only 64 kb/s of digital transport. The line card functions of sampling and conversion to the digital channel format limit the communications on the line to the voice frequency bandwidth, originally selected to optimize voice communications, i.e. somewhat less than 4000 Hz.

In addition to the plain old telephone service (POTS) provided over line $11_1$, the TELCO network 30 provides a number of digital subscriber line (DSL) services. The present invention relies on use of the signaling data (D) channel, for example of a type standard on ISDN services, and the adaptation thereof for use with certain DSL services which dedicate the bearer capacity of the line to other communications, typically data.

Although adaptable to other DSL services, the initial implementation of the inventive D-channel voice communication applies to an IDSL service. IDSL is typically implemented as a special application of IDSN line technology. Accordingly, it may be easiest to appreciate the relevant aspects of IDSL if considered together with switched ISDN service. Also, the invention may be applied to ISDN services, to provide a channel for a virtual third line, when the B-channels are in use on other services. To facilitate understanding of the invention, FIG. 1 therefore depicts both ISDN and IDSL services.

The subscriber at the CP-2 customer premises $1_2$ subscribes to normal ISDN services over the line $11_2$. The subscriber at the CP-3 customer premises $1_3$ subscribes to the IDSL service provided over the third line $11_3$.

The network portion of each digital subscriber's Telephone line wiring $11_2$ or $11_3$ ends at a network termination (NT-1) at the customer premises. Such a network termination is a standard ISDN component providing the electrical connection and interface and certain standardized intelligent functions relating to maintenance and testing.

At the second customer premises CP-2, having the ISDN service, the NT-1 13 operates in a switched service mode, for normal ISDN service over the line $11_2$. The network termination NT-1 13 provides connection between the in-house wiring and the telephone line $11_2$ to the TELCO network 30.

For normal telephone service, the customer premises wiring runs from the NT-1 to a terminal adapter unit (TAU) 15, which provides an interface for a standard analog type telephone device 17. The wiring may also connect to ISDN capable telephone equipment (not shown). For data services, a data device shown by way of example as a multimedia personal computer (PC) 19 includes an ISDN card 21. The ISDN card connects through the customer premises wiring to the NT-1 13 and through that network termination to the ISDN telephone line $11_2$.

The ISDN capable devices 15, 21 function as normal switched service communication equipment. As such, either device may access the D-channel or one or both B-channels provided by the TELCO network 30 over the telephone line $11_2$. If each uses one of the B-channels, the subscriber may have a data session going through the PC 19 and a concurrent telephone conversation through the telephone 17 and the TAU 15. For some applications, the PC 19 and the ISDN card 21 may use both B-channels, concurrently, for a higher rate data session.

The subscriber at premises CP-3 subscribes to a digital subscriber line service, shown by way of example as an IDSL service. Like the CP-2 subscriber, the network portion of the subscriber's telephone line wiring $11_3$ ends at a network termination (NT-1) 23. Although this subscriber has an IDSL service, the termination NT-1 23 is a standard ISDN component providing the electrical connection and interface and certain standardized intelligent functions relating to maintenance and testing exactly the same as the NT-1 termination 13. The termination 23, however, operates in a dedicated or "leased-line" mode.

At the third customer premises CP-3, the network termination NT-1 23 provides connection between the in-house wiring and the telephone line $11_3$ to the TELCO network 30.

In this case, however, the in-house wiring runs to one or more ISDN cards 27 associated with the data devices, shown by way of example as another multimedia PC 25. As discussed more later, the network 30 provides a dedicated data link service at the rate equivalent to the two B-channels over the second line $11_3$.

In the "leased line" mode, the B-channels pass through the NT-1 termination 23 and the line $11_3$, but in this mode, there is no need for D-channel signaling to control any switched connections for the B-channels. However, to maintain ISDN compatibility on the line $11_3$, in accord with the ISDN standard, the termination 23 does keep the D-channel alive. Although not used for normal ISDN signaling, the D-channel does pass through the NT-1 termination and is available on the line. The invention entails use of this available channel for voice-grade telephone communications.

The third customer premises $1_3$ also has an interface 28 and one or more analog telephone devices 29. The telephone 29 connects through normal twisted wire pair to the interface 28, and the interface in turn connects through the customer premises wiring to the NT-1 termination 23. The interface 28 is generally similar to the terminal adapter unit (TAU) 15 used for voice telephone communications over the ISDN line $11_2$. Like the TAU, the interface 28 provides the analog telephone type interface to the associated telephone, for example, to supply DC loop current and ringing current, and detect on-hook/off-hook states of the analog equipment. Also, like the TAU, the interface 28 performs two-way coding and decoding functions to communicate the analog voice information to and from the telephone via the digital line.

The coding and decoding performed by the interface 28, however, involves compression. A standard ISDN terminal adapter unit, such as 15, converts back and forth between analog signals and 64 kb/s pulse amplitude modulated (PAM) digital signals. The 64 kb/s PAM signals match the capacity of one of the B-channels on the line and one of the DS0 channels through a T1 circuit 33. In contrast, the coding circuitry in the interface 28 digitizes and compresses the analog information down to a rate enabling transport over the 16 kb/s D-channel. Similarly, the decoding circuitry in the interface 28 decompresses voice frequency data received at the 16 kb/s rate and converts it to analog information for output via the telephone 29.

The interface 28 also performs some call set-up signaling over the D-channel, in a manner similar to a portion of the D-channel signaling performed by the TAU 15. In particular, the interface 23 sends and receives normal D-channel signaling relating to line states, e.g. off-hook, ringing, ring-trip, on-hook, etc. However, in the presently preferred embodiment, once the interface 28 has signaled seizure of the D-channel on the line $11_3$, the interface provides a pass-through for all other signaling to and from the telephone 29. For example, on an outgoing call, the interface 23 detects an off-hook by the telephone 29. The interface signals this condition over the line and establishes a channel to the switch 37. The switch sends dialtone in-band, and the interface 28 passes the dialtone signal to the telephone 29 for presentation to the caller. The caller activates the keys of the telephone to dial a destination number, and the telephone 29 generates appropriate dual-tone multi-frequency (DTMF) signals. The interface 28 digitizes the tones and sends the signals in-band to the switch 37. The switch 37 performs its normal processing, e.g. to complete the call to the destination identified by the dialed number.

As noted, the TELCO may provide other voice and data services. However, for the illustrated digital line subscribers at locations $1_2$ and $1_3$, the TELCO 30 provides switched ISDN service and the IDSL dedicated data link service. TELCO networks provide digital subscriber line services in a number of different ways, for example, with line connections direct to end office switches, through digital loop carrier (DLC) systems, etc. The illustrated embodiment utilizes a D4 carrier system comprising a channel bank 31, one or more T1 circuits 33 and another channel bank 35. Effectively, the remote D4 channel bank 31 is at the edge of the transport fabric of the TELCO network.

The D4 system is a carrier system, similar to loop carrier systems. The channel banks are essentially similar to the remote and central office terminals of loop carrier systems. However, the modern loop carrier systems are engineered to provide pair gain, i.e. they handle more channels to/from subscriber premises than they can simultaneously transport to and from the central office. By contrast, the D4 carrier system outputs as many channels as it receives, in each direction. For example, if the D4 system has 24 channels to/from customer premises, it always transports all 24 of those channels as DS0s on the assigned T1 link 33 between the channel banks 31, 35.

For purposes of this discussion, assume that both of the exemplary digital subscriber line customers receive service through a D4 carrier system. Each of the digital subscriber lines $11_2$, $11_3$ connect from the customer premises to a D4 channel bank 31. In FIG. 1, the ISDN and IDSL lines $11_2$ and $11_3$ connect directly to the remote D4 channel bank 31. Those skilled in the art will recognize that there are a number of techniques for extending the digital subscriber lines out to greater distances, which utilize additional equipment in the loop plant. For example, for lines more than 18,000 feet in length, the lines may include mid-span repeaters, digital loop carrier (DLC) systems or combinations thereof between the remote channel bank and the customer premises. Such equipment is typically ISDN compatible and passes the B and D channels through, both for ISDN and IDSL.

A D4 channel bank 31 is a device that interfaces one or more high capacity T1 lines 33, each of which carries 24 voice rate (DS0) channels in assigned 64 kb/s time slots. The remote channel bank 31 provides two-way time-slot interchange type switching to couple packets for the various channels on the lines $11_2$, $11_3$ and similar lines to and from the assigned slots on the T1 links 33. One channel unit, in the D4 bank, provides the interface for up to 24 channels on one T1 link. The channel unit interfaces to the T1 line through the common circuitry in the D4 bank, in accord with the particular service provided, in this case, ISDN or IDSL.

The T1 links 33 run from the remote or downstream D4 channel bank 31 to an upstream or network-side D4 channel bank 35. As shown, the channel bank 35 typically is a stand-alone component. However, the capability of the network-side D4 channel bank can be incorporated directly into the central office switch 37 or the hub switch 41.

For customers having the normal switched ISDN service, such as the customer at premises CP-2, the network-side channel bank 35 separates out DS0 channels carrying the various ISDN line channels, recombines the data from the DS0s into the BRI format (2B+D), and supplies those BRIs to digital line cards on the CO switch 37. The CO switch 37 provides selective connections of the B-channel communications to other lines connected to the switch, for example to the line $11_1$ or the line to the Internet 61. The CO switch 37 also provides selective connections of the B-channels through the public switched telephone network (PSTN) 49.

These switched connections support both voice and data communications, at the 64 kb/s rate.

Of particular note, the switched ISDN service involves all of the channels carried on an ISDN line. The channels include the two B-channels, the D-channel and an embedded operations channel (EOC). The two B-channels translate into two DS0 channels for transport over the T1 link. The EOC and D channels are combined on another DS0 within the T1 link 33. At the upstream channel bank 35, the B, D and EOC channels for one customer are communicated to and from the switch 37 over a BRI type ISDN line, so that the line $11_2$ appears as a pass-through all the way from the premises $1_2$ to the switch 37. The switch communicates with the customer premises equipment over the D-channel, for call set-up and tear-down signaling and the like. The switch provides selective connections for the B-channels, for call transport of digital voice and data services. The switch communicates with various ISDN devices in the line, using the EOC channel, for synchronization, maintenance and testing purposes.

In the illustrated embodiment of the dedicated data services, the network-side D4 channel bank 35 connects DS0 channels carried through one or more of the T1 links 33 to a hub switch 41. The switch 41 provides an interface connection to a high-speed backbone network. In the example illustrated in FIG. 1, the switch 41 provides an interface and connection to a high speed form of packet network 45 network, such as a Frame Relay network, a super multi-mega-bit data service (SMDS) network or an asynchronous transfer mode (ATM) network.

Although not shown, the DS0s for the dedicated data services may connect to the hub 41 through a digital cross connect switch (DCS). The channel connections through the DCS would be nailed-up, to provide the logical connections illustrated in the drawing. The point to point or dedicated 2-B channel service could run to another end user's device, for example, for a connection of a remote terminal to a port on a host computer. In the illustrated embodiment, the point-to-point link runs to the hub switch 41 of the backbone data network 45.

For the dedicated data service, the network-side channel bank 35 hands-off two DS0 channels to the hub switch 41. These two channels carry the full 128 kb/s data transported on the two B-channels of the IDSL line $11_3$. Of particular note for purposes of the invention, the D-channel is not part of the IDSL service and is not needed for call set-up for the B-channel communications because the links for the B-channels are nailed-up. The EOC channel also does not go through to the other end of the point-to-point circuit, because the device at the opposite end has no need for maintenance related communications with the device(s) at the customer premises.

From the customer premises $1_3$ to the hub switch 41, the channel banks, T1s and DS0 connections actually provide fractional T1 service from the customer premises to the packet switched network 45. Fractional T1 is a service that meets a customer requirement for high data rates, which are still less than full T1. The T1 or equivalent DS1 rate represents a combination of 24 of the 64 kb/s DS0 or B channels, at a total data rate of 1536 Mb/s. Customers are assigned predetermined portions of the T1 capacity. For example, in the New York area, fractional T1 is offered in increments of two DS0 channels beginning at 128 kb/s (2 channels) up through a maximum of twelve channels, excluding the ten channel variation. In a typical implementation of fractional T1, the carrier company connects a full T1 at the customer premises. Within that T1, the carrier assigns X number of DS0s (2, 4, 6, 8 or 12) that the customer purchases for the desired digital bandwidth.

For older installations, the carrier actually connects the T1 all the way from the customer premises to the intended destination, such as the packet network 45 shown in FIG. 1. The unused DS0 slots on the T1 link are active only within the line. The network transports only the assigned DS0s.

Today, a customer such as the customer at premises CP-3 desiring two DS0s for fractional T1 access can utilize the 2 B-channels of a dedicated IDSL type subscriber line circuit. This type of data service provides two-way data communication at the combined (2) DS0 or B-channel rate of 128 kb/s over a normal twisted pair telephone line $11_3$. For many applications, this provides a substantial improvement over modem rates and a doubling over the single B-channel rate. The IDSL circuit extends from the channel bank 31 through the network termination (NT-1) 23 to the ISDN card 27 on the customer premises. The channel bank 31 couples the 2B-channels of the IDSL circuit to 2 DS0 slots in a DS1 rate or T1 circuit 33. The T1 circuit 33 connects to the D4 channel bank 35, and the channel bank 35 passes the 2 DS0 channels through to the hub packet switch 41.

The switch 41 and the packet network 45 in turn provide high-speed packet switched communication to private Intranets 51, and through such a network 51, to private data devices such as hosts or servers 53 and PCs or other terminals 55. The packet network 45 also provides high-speed packet switched communication to the public packet switched data highway, now commonly known as the Internet 61. The Internet is an interconnected series of networks, which interconnect and communicate across the network boundaries using a standard suite of protocols, referred to as Transmission Control Protocol/Internet Protocol (TCP/IP). The Internet 61 provides data communications to servers 63 and to other terminals and PCs 65, for a wide range of purposes. Data communications through the Internet include, for example, E-mail, fine transfers, video conferencing, web page browsing and a whole host of other multimedia applications.

As noted, the D-channel is not used for the dedicated data service provided over the IDSL line $11_3$. However, the D-channel is alive and available on that line. In accord with the invention, the D-channel is now used as a third communication channel, specifically, to support normal voice telephone communications.

Switched ISDN, such as provided to the customer at premises CP-2, typically utilizes three DSC time slots through the D4 channel bank 31 and the T1 link 33. Two of these time slots transport the two bearer (B) channels. The other slot transports the embedded operations channel (EOC) and the data (D) channel for the one subscriber's ISDN service. Some vendors are developing systems that combine D and EOC channels for two subscribers' lines, for transport over one DS0, to recapture unused capacity.

The dedicated service also uses two DS0 time slots, allocated to the data service. In accord with the invention, the D-channels for four of the lines are combined into another DS0 for transport through the carrier system. Specifically, the D4 channel bank 31 identifies four lines like $11_3$, as the D-channel becomes active for voice telephone communications. The channel bank 31 performs appropriate multiplexing/demultiplexing of the D-channel signals into one DS0 at the combined 64 kb/s rate. A single DS0 on a T1 link 33 is allocated to each four D-channel communications that the system should support.

The network-side channel bank 35 provides connections for a number of DS0 channels. In the downstream direction, the channel bank aggregates these channels for transmission over the T1(s) 33 to the channel bank 31. In the upstream direction, the channel bank 35 separates DS0 channels from the T1(s) and supplies those DS0 channels to appropriate ports. In accord with the invention, the D4 channel bank 35 provides at least one DS0 connection to an interface 39. The particular DS0 channel is that carrying the four combined D-channels used for the voice-grade telephone communications.

For each DS0 carrying the D-channel voice communications, an interface 39 provides four line connections to the CO switch 37. The interface 39 performs the multiplexing and demultiplexing between the DS0 and the four D-channel signals. The interface 39 also performs the protocol conversions between the signal format used on the D-channel and the appropriate format for each line connection to the CO switch 37. The interface 39 may also perform some call set-up signaling with the interface 28, for example to indicate an incoming call and to respond to an off-hook and inform the switch of a line seizure on the D-channel at the customer premises.

The interface 39 may be a stand alone device. Preferably, the interface 39 is incorporated into the network-side channel bank 35 (see FIG. 2).

Figure 2:
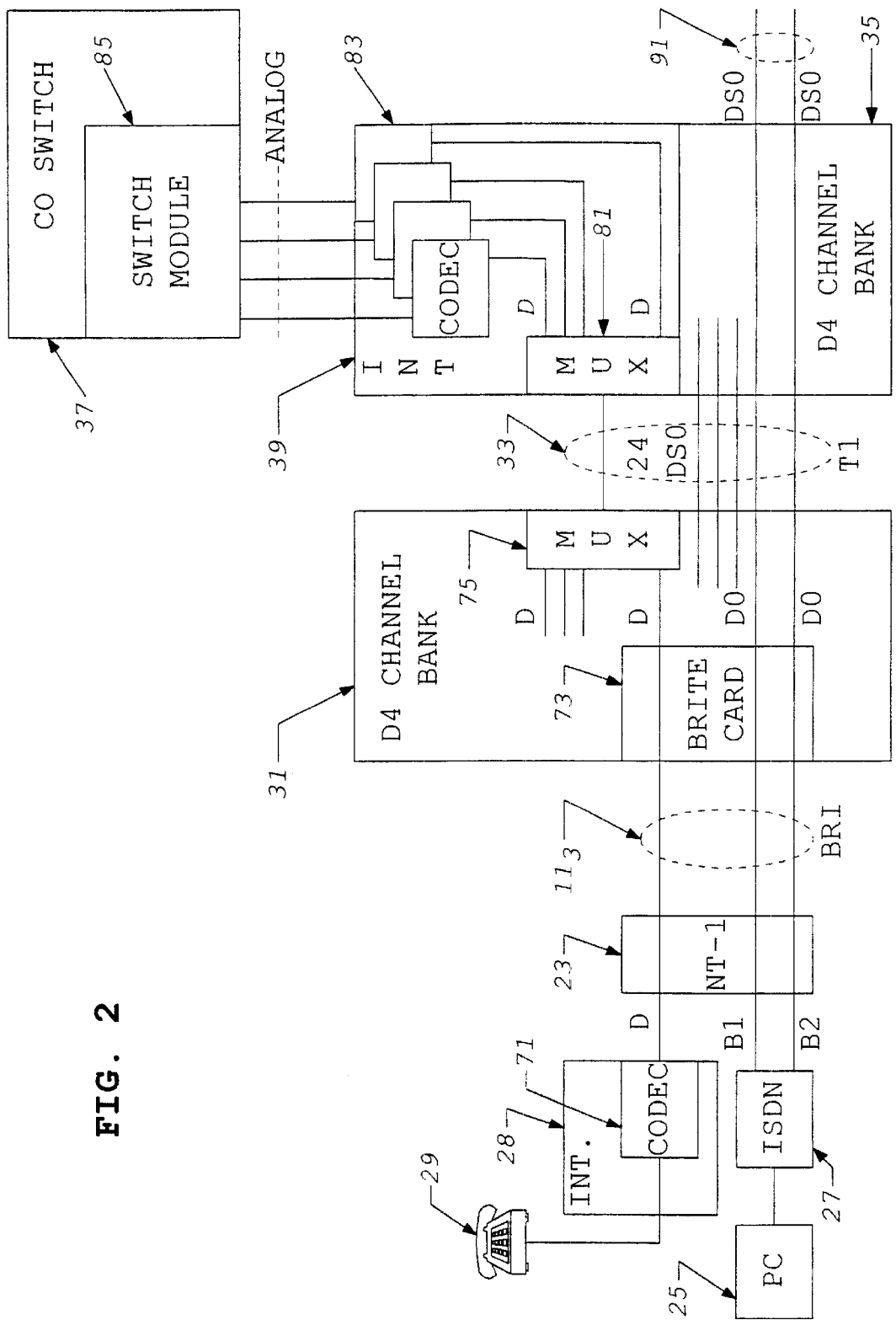
FIG. 2 is a functional block diagram of a portion of the system of FIG. 1, depicting certain elements in somewhat more detail and illustrating the channel flow through those system elements.

FIG. 2 provides somewhat more detail of the elements involved in communications over the IDSL subscriber's line $11_3$ and shows the channel flow through the network, for those communications. Like elements in FIGS. 1 and 2 are indicated by the same reference numerals.

As discussed above the line $11_3$ is a standard telephone line, typically twisted wire pair at the network termination. As shown in FIG. 2, however, that line actually carries three logically separate channels. Two of the channels B1, B2 are bearer channels, each providing 64 kb/s of digital transport capacity. The other channel is the low-speed (16 kb/s) signaling data channel D.

The customer has a PC 25 with an ISDN card 27 coupled to the network termination 23 (NT-1). For the IDSL data service, the card 27 operates in a dedicated or leased-line mode and utilizes both B-channels B1, B2. As such, the bearer capacity on the line $11_3$ is fully engaged or dedicated to the data service to the PC 25. However in this mode, the B-channel is alive but inactive.

The telephone 29 connects to the interface 28, for D-channel communications. Logically, the interface connects to the D-channel, through the NT-1 termination 23 and the line $11_3$. The interface 28 is generally similar to a terminal adapter unit, with D-channel signaling capabilities. However, the CODEC (coder/decoder) in the interface 28 is somewhat different. In particular, the CODEC 71 in the D-channel interface 28 provides the two-way conversion between analog voice frequency telephone signals used by the telephone 29 and digital information compressed for communication at the 16 kb/s D-channel rate.

In accord with the invention, the NT-1 termination passes the B1, B2 and D channels back and forth between the customer premises devices 27, 28 and the line $11_3$. The line runs between the customer premises and the first D4 channel bank 31.

At the channel bank each digital subscriber's line, such as the lines $11_2$, $11_3$, terminates on a line card 73, referred to as a "2B BRITE D4 UNIT". The term "BRITE" refers to a "Basic Rate Interface Terminal Equipment" type line card 73 in the D4 channel bank 31. Some vendors use slightly different terminology, such as "U-BRITE," to refer to their version of these line cards. The BRITE card provides the electrical interface to the particular two-wire subscriber line 11. The BRITE card also processes the various channels on the subscriber's line, in the manner determined by its options settings. For ISDN service for example, the BRITE card couples the B-channels, the D-channels, and the EOC through the time slot interchange circuitry of the D4 channel bank 31 to assigned DS0 channels in the appropriate T1 33. Each B-channel occupies one DS0 time slot on the T1. For ISDN, the BRITE card and the common circuitry of the channel unit couple the D channel and the EOC together to another 64 kb/s DS0 time slot on the T1 link, to carry those channels to the serving central office switch 37.

Each "BRITE" card 73 actually provides ISDN terminations for a number of subscriber lines. For each subscriber line terminated on the BRITE card 73, the card provides the ISDN standard electrical and protocol interface to the wiring of the line.

As shown in FIG. 2, the IDSL line 113 runs from a BRITE line card 73 and terminates at the customer premises in a standard NT-1 unit 23, for connection of customer premises wiring from the subscriber's data equipment 25, 27. For the IDSL only service, the BRITE card 73 would be set to a "leased line" mode for 128 kb/s service and does not pass the B-channel. For the inventive service, however, the line card is set to one of two "special modes" for throughput of the B-channels as in the leased-line mode but with special processing for the D-channel as discussed later relative to FIG. 3. The NT-1 operates in a normal ISDN mode, for pass-through communication over the two B-channels (B1, B2) at the combined rate of 128 kb/s and for pass-through communication over the D-channel to and from the interface 28.

The ISDN and IDSL services use similar protocols on the line, but the IDSL service is a dedicated data link service, whereas the normal ISDN service is a switched service. In particular, the BRITE line card 73 serving the IDSL subscriber provides a standard 2B1Q coded ISDN Digital Subscriber Loop (IDSL) U-interface facing the NT-1 23 at the customer premises over the line $11_3$. The U-interface supports the full 2B+D+EOC ISDN communications on the line $11_3$. The three elements, B-channels, D-channel and EOC-channel, form a 160 kb/s transport signal scheme conforming to the basic rate interface (BRI) of ISDN.

ISDN equipment all conforms to an established standard, for a wide range of physical and functional characteristics, including, for example, the line cards, the terminations and devices such as repeaters and loop carrier system interposed in the line between the central office and the customer premises. Of note for purposes of the present invention, all such line equipment sends, receives or passes through a 16 kb/s data stream conforming to the D-channel for ISDN service. The IDSL service, however, does not normally provide transport for the D channel through to the switch. For dedicated or leased line type services, such as IDSL, the channel bank 31 only couples the B-channels to the higher-level network elements.

As shown in FIG. 2, however, the BRITE card 73 in the channel bank 31 now couples the D-channel for the line $11_3$ to a multiplexer/demultiplexer or "MUX" 75. The MUX 75 similarly connects to three other BRITE cards (not shown) of customers receiving the D-channel voice service. These four connections may be hard-wired, as illustrated, but preferably these connections may be set-up on demand as D-channel telephone calls are made or received.

In the upstream direction, the MUX 75 combines the digitized and compressed telephone information of four D-channels, from four line cards 73, into the upstream portion of one DS0 channel. The MUX 75 sends the upstream DS0 stream through an assigned slot on the T1 33 to the channel bank 35. In the downstream direction, the MUX receives a 64 kb/s stream from the assigned DS0 slot on the T1 33. The MUX 75 segregates the received stream into four D-channel streams and supplies those streams to the BRITE cards 73 for D-channel transport over the lines to the customer premises. In one embodiment, the DS0 port of the MUX 75 connects back through a line card, for actual DS0 coupling to the high-speed link 33.

The T1 link 33 carries 24 of the DS0 channels between the D4 channel banks 31 and 35. Nor the dedicated data service, the channel bank passes the DS0 channels carrying the B1, B2 data streams through to a port 91, coupled to the switch 41 as described above relative to FIG. 1. The DS0 assigned to transport the D-channel voice communications, however, is coupled to another multiplexer/demultiplexer or "MUX" 81. The MUX 81 is similar to the MUX 75.

In the upstream direction, the MUX 8 receives the 64 kb/s stream from the assigned DS0 slot on the T1 33, which contains the four D-channels. The MUX 81 segregates the received stream into four D-channel streams and supplies those streams to the four CODECs 83. In the downstream direction, the MUX 75 combines the digitized and compressed telephone information of four D-channels, from the four CODECs 83, into the downstream portion of one DS0 channel. The MUX 75 sends the upstream DS0 stream through an assigned slot on the T1 33 to the channel bank 31.

Each digital coder/decoder circuit or "CODEC" 83 performs two-way conversions between digital and analog signals, similar to those performed by the CODEC 71. Specifically, a CODEC 83 decompresses the digital D-channel audio signal and converts the digital information on the upstream portion of the D-channel to an analog signal compatible with a standard telephone line. In the downstream direction, the CODEC 83 receives analog audio information and converts and compresses it for D-channel transmission. The CODECs 83 also include appropriate line interface circuitry so that, on the upstream side, the CODECs 83 provide four analog telephone interfaces, effectively simulating the customer's POTS customer-premises equipment.

Although not separately shown, the CODECs 83 include or are associated with D-channel signaling equipment, of the type normally used in an ISDN line card of a telephone switch. This signaling equipment conducts certain signaling communications with the interface 28 at the customer premises over the D-channel link, for example, to inform the interface of an incoming call and receive indication of an off-hook by the telephone 29.

The CODECs 83 connect through individual telephone line circuits to a switch module 85 in the CO switch 37. The CO switch 37 may comprise equipment from a number of vendors, such as Seimens and Nortel. A typical CO switch sold by Lucent Technologies is their 5ESS. In the latest version of the 5ESS, the switch module 85 is identified as a 'Switch Module 2000'. This module performs line and trunk connection functions and time-slot interchange type packet switching. The module 85 performs intra-module switching between line channels and trunk channels connected to the module. The module 85 performs switching between the connected line and trunk channels and a communication module, for connections to other line nets or trunk nets.

Figure 3:
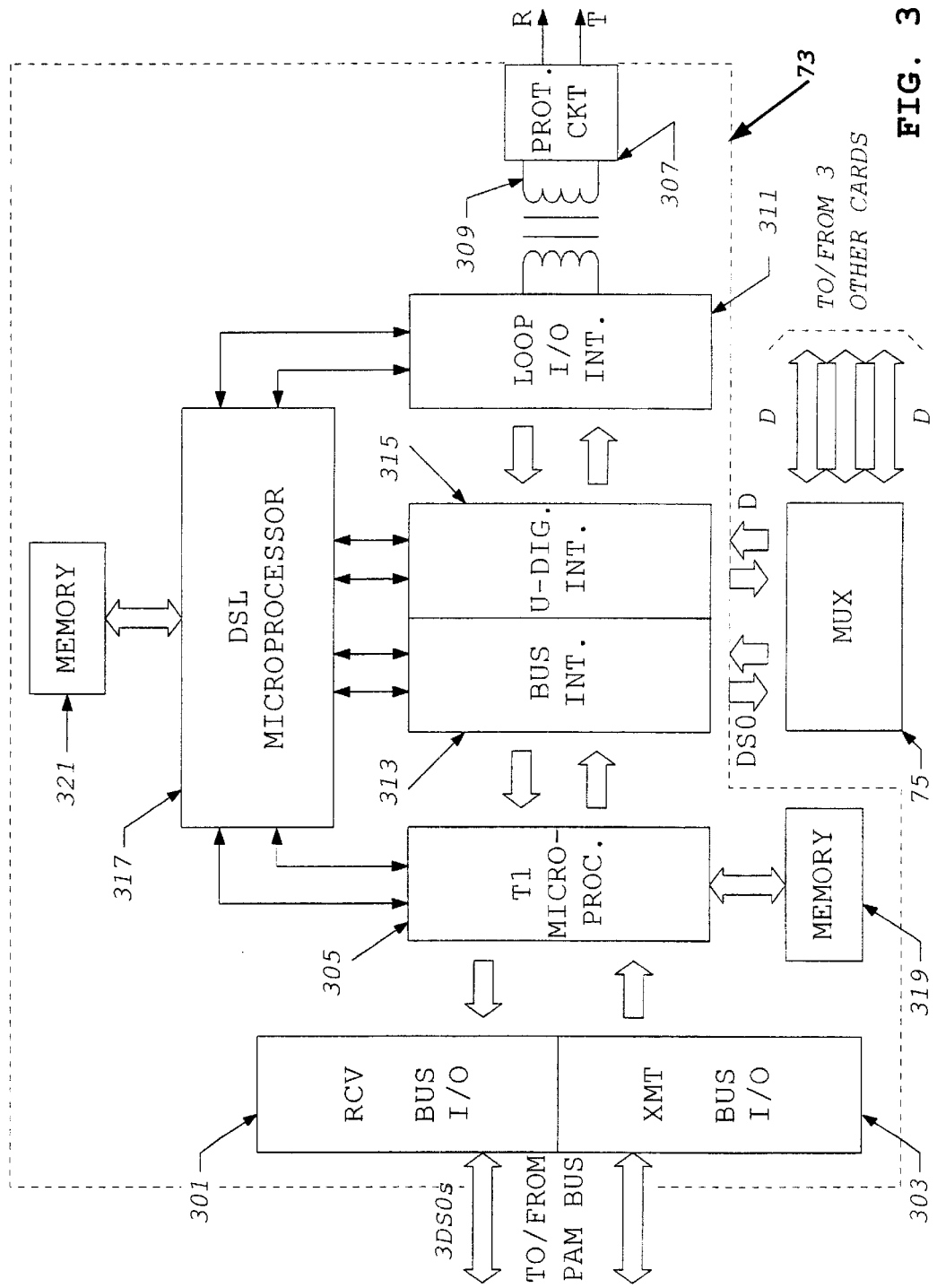
FIG. 3 is a block diagram showing the major components of a line card of a channel bank in association with the multiplexer/demultiplexer, as used in an implementation of the present invention.

FIG. 3 depicts the most relevant portions of one possible implementation of a BRITE line card 73 of the type used in the present invention, in simplified block diagram form. The portions of the line card 73 illustrated in FIG. 3 include a receive bus input/output (I/O) interface 301 and a transmit bus I/O interface 303. These I/O devices provide two-way data transfers to and from the pulse amplitude modulation (PAM) bus of the channel bank. The bus (not shown) serves as the time-slot interchange mechanism within the D4 channel bank 31, for multiplexing/demultiplexing channels for a number of such cards to and from the 24-channel T1s. The bus I/O interfaces 301, 303 in turn connect to a T1 microprocessor 305, which processes the signals as appropriate for transmission and reception via the channels on the T1s.

In operation, the line card is assigned time periods for accessing the PAM bus. Each time that an assigned period occurs, the particular card can send and receive digital information on the bus. If the card is allocated two DS0 slots, for example for two B-channels, each time a period occurs for one of those slots, the card sends and receives information via the bus for the particular channel. For an ISDN service, the card is assigned an additional slot for D-channel and EOC channel transport. In accord with the invention, one of the line cards 73 also processes the DSC assigned for the multiplexed D-channel voice communications. In either D-channel case, the T1 microprocessor 305 and bus I/O interfaces 310, 303 of the card recognize the period for access to the bus for a third assigned DS0 and send and receive the appropriate channel information via the bus during that third period.

The tip (T) and ring (R) leads of the customer's line connect through protection circuitry 307 and a transformer 309 to a loop-side I/O interface 311. A bus interface 313 and a U-digital interface 315 interconnect the T1 microprocessor 305 and the loop I/O interface 311. Through the transformer and the protection circuit, the loop I/O interface 311 provides the standard digital and electrical characteristics for the ISDN compatible appearance of the card facing toward the customer premises over the subscriber's line. The line card 73 also includes a digital subscriber line (DSL) microprocessor 317. The DSL microprocessor 317 controls overall operation of the line card 73.

One commercial example of a line card that may be adapted and programmed to function as the line card 73 is the Teltrend D4/SLC-96 ISDN Basic Rate Interface Channel Unit Model BRI4801I2 or Model BRI4801RP2.

The microprocessors 305 and 317 both are programmable devices, and for programming purposes, both devices include or are associated with program memories 319, 321. The memories are shown separate from the respective microprocessors for purposes of discussion.

For the D-channel voice operation, the Programming in the memory 321 causes the DSL microprocessor 317 to control the U-digital interface 315 to couple the D-channel communications on the line to a separate port, shown connected to the MUX 75. The particular line card 73 may also serve as the PAM bus interface for the multiplexed D-channel information, for the D-channel voice communications. In that case, the programming in the memory 321 causes the DSL microprocessor 317 to control the bus interface 313 and the T1 microprocessor 305 to couple a DS0 from the MUX 75 through to an assigned DSC time slot on the PAM bus.

Consider a brief example of an actual voice-call processing operation. A customer at the CP-3 premises $1_3$ (FIG. 1)

subscribes to the IDSL data service and to the D-channel voice telephone service. A person at the location $1_3$ elects to make an outgoing call. The person lifts the handset of the telephone 29, in the normal manner, and the interface 23 detects an off-hook condition on the analog customer premises wiring. The interface signals this condition over the D-channel on the line $11_3$. The system passes this signal through all the way to one of the CODECs 83 in the channel bank 35 (FIG. 2). The CODEC goes "off-hook" on the line connection to the switch module 85 and provides a response message back over the D-channel to the interface 28.

A full audio channel, compressed to the 16 kb/s rate exists between the interface 28 and the CODEC 83, and a normal line connection exists between the CODEC 83 and the CO switch 37. The switch 37 sends dialtone in-band to the CODEC. The CODEC 83 digitizes and compresses the analog audio and sends the dialtone through the D-channel to the interface 28. At the interface 28, the CODEC 71 converts the signal back to analog audio information and supplies the audio over the wiring to the telephone 29 for presentation to the caller.

The caller hears dialtone in the normal manner and activates the keys of the telephone 29 to dial a destination number. The telephone 29 generates appropriate dual-tone multi-frequency (DTMF) signals and applies those signals to the wiring connected to the interface 28. The CODEC 71 in the interface 28 digitizes and compresses the tones and sends the signals over the D-channel to the CODEC 83. The CODEC 83 converts the D-channel digital signal back to analog audio information and supplies the audio information over the line to the switch module 85. This audio signal now contains the DTMF tone signals representing the dialed destination number. The switch module 85 interprets those tone signals and responds in the normal manner. As a result, the switch 37 executes its normal processing routines to establish and bill for an outgoing call connection to the destination identified by the dialed digits.

If the called party answers, the switch 37 and any other necessary elements of the PSTN 49 establish a standard voice grade communication link between the destination and the line between the switch module 85 and the particular CODEC 83 serving the caller. The communications over that link are processed in the normal manner. On the line to the CODEC, incoming and outgoing audio signals appear as normal analog voice-frequency telephone signals. The CODECs 71 and 83, however, enable two-way communication of such signals between the customer premises and the D4 channel bank 35 on the 16 kb/s D-channel.

Those skilled in the art will recognize that similar procedures are involved in establishing the connection for conducting communications on an incoming call to the telephone 29, using the D-channel voice communications. Also, although voice telephone communications were used in the example, it should be noted that any communication that can utilize voice-frequency transport, such as analog modem or facsimile communications can use the D-channel communications of the present invention.

In the embodiment illustrated in the three drawing figures, the carrier provides an IDSL type line between a D4 channel bank and the customer's premises. For data communications, the line carries fractional T1 bandwidth corresponding to two DS0 channels (matching the two B-channel capacity of the line). For data service, the fractional T1 link couples the B-channels to a high-speed packet network, such as frame relay, SMDS or ATM, to enable access to the Internet or private data networks. The line circuit also transports the D-channel and the embedded operations channel (EOC), in normal ISDN fashion, but only between the channel bank and the network termination unit (NT-1) in the customer premises. In accord with the invention, the D-channel is used to carry normal telephone traffic, albeit at the compressed D-channel rate. This provides the IDSL subscriber the additional ability to make and receive standard telephone calls. Through the carrier system, several of the D-channel communications may be multiplexed together in one DS0 or bearer channel, to maximize the efficiency of the channel allocation through that system.

Persons skilled in the art will appreciate that the invention admits of a variety of applications and modifications, which fall within the spirit and scope of the concepts of the invention. For ease of explanation, the above embodiment utilized CODECs at the CO end of the D4 carrier system, to simulate an analog line appearance to the switch module in the CO switch 37. Alternatively, the MUX 81 could connect the D-channel streams to the switch via compression/decompression circuitry. On the downstream side of such circuitry, the signals take the form of D-channels carrying voice and call set-up signaling data at the 16 kb/s rate, as discussed above. However, the compression/decompression circuitry would provide conversions for each such stream to and from a DS0 rate 64 kb/s stream, conforming to the standard DS0 line interface, for example used by digital loop carrier systems (see e.g. TR008 or TR303). This eliminates any actual conversion to and from the analog form within the network.

In the illustrated embodiment, the D4 channel bank on the network side coupled the D-channel communications to a switch module 85 in the central office telephone switch 37. A wide range of different voice communication options is under development, for example, using packet switched or ATM communications for the voice information. With such a voice communication network, the upstream connections from the MUX 81 would run to the packet or ATM switch, rather than through the CODEC or compressor/decompressor coupled to the switch 37. In a packet or ATM implementation, the interface coupled to the MUX would perform any necessary conversions between the ISDN D-channel protocol and the TCP/IP packet or ATM cell format. The interface would also perform any call set-up signaling with the interface 28 at the customer premises and provide packet or cell addressing to facilitate the virtual channel voice communications through the packet or ATM network.

Also, the above discussion of illustrated embodiments concentrated on application of the D-channel voice communications to the IDSL service. The present invention may be adapted to switched ISDN services, as well. For example, U.S. Pat. No. 5,444,703 to Gagliardi et al. teaches dynamic allocation of the B-channels, particularly to various networked computers for data communications. In an application that makes the B-channels available for such allocation to data communications, it may be desirable to allow use of the D-channel for voice communications in a manner similar to that described above for the IDSL service.

Also, the discussion of the invention above concentrated on use of the D-channel over a BRI type ISDN line. At present, the TELCOs and the telecommunication equipment vendors are deploying a number of newer digital subscriber line (DSL) technologies. Many of these technologies implement one or more traffic channels, which carry or bear the actual communications in a manner analogous to the B-channels of ISDN. The new DSL circuits also carry one or more lower-speed signaling data channels, which carry signaling data similar to that normally carried on the D-channel of an ISDN circuit. The present invention may be adapted to provide voice communications using the low-speed signaling channel of the newer higher-rate DSL lines.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of communicating voice-grade telephone information over a digital subscriber line having bearer capacity assigned to other communications and a lower-speed signaling data channel, the method comprising the steps of:
    compressing the voice telephone information for the digital subscriber line to the lower-speed;
    communicating the compressed information over the line within the signaling data channel;
    multiplexing the signaling data channel with information from at least one other signaling data channel for another subscriber line, to form multiplexed data;
    transporting the multiplexed data via a carrier system coupled between the line and a switch; and
    coupling the compressed information for the digital subscriber line of the multiplexed data with a voice telephone link extending through the switch to a distant telephone station.

2. A method as in claim 1, wherein:
    the bearer capacity comprises two ISDN bearer (B) channels; and
    the signaling data channel comprises an ISDN data (D) channel.

3. A method as in claim 2, wherein the bearer capacity is dedicated to data service.

4. A method as in claim 2, wherein the multiplexing step comprises selectively multiplexing the signaling data channel with information from up to three other signaling data channels, to form the multiplexed data at a bearer channel rate.

5. A method as in claim 1, wherein the carrier system comprises a pair of channel banks interconnected by at least one high-speed link.

6. A method as in claim 1, wherein the coupling step comprises segregating the compressed information from the multiplexed data, decompressing the compressed information to recover the voice-grade telephone information, and coupling the recovered information to the switch.

7. A method as in claim 6, wherein the coupling of the recovered information to the switch comprises: converting the voice-grade telephone information to analog information and coupling the analog information to an analog port of the switch.

8. A method as in claim 1, wherein the switch comprises a switch selected from the group consisting of: a telephone switch, a packet switch and an asynchronous transfer mode (ATM) switch.

9. A method as in claim 1, wherein the compressing step comprises:
    receiving analog voice-grade telephone information;
    converting the analog voice-grade telephone information to digital data; and
    compressing the digital data to the lower rate.

10. A method as in claim 9, wherein the receiving step comprises receiving voice frequency audio signals from an analog telephone device.

11. A method as in claim 1, wherein the digital subscriber line comprises an Integrated Services Digital Network (ISDN) line.

12. A method as in claim 1, wherein the subscriber line comprises ISDN Digital Subscriber Line (IDSL).

13. A communication network, comprising:
    a transport fabric for carrying digital communication channels assigned to subscriber lines, said transport fabric including at least one switch for voice-grade telephone services;
    a digital subscriber line running from a customer premises to an edge of the transport fabric of the network and carrying a bearer communication channel and a logically separate signaling data (D) channel;
    a line card for connection to the digital subscriber line at the edge of the transport fabric of the network for throughput between a communication channel assigned to the digital subscriber line in the transport fabric and the bearer communication channel on the digital subscriber line; and
    a multiplexer coupled to said line card for communicating voice-grade telephone information via the D channel on the digital subscriber line and coupling the D-channel and at least. one other D-channel through another of the communication channels of the transport fabric of the network to the switch.

14. A communication network as in claim 13, wherein the line card and the communication component are capable of selectively supporting ISDN and IDSL. service over the digital subscriber line.

15. A communication network as in claim 13, wherein:
    the line card and the multiplexer are elements of a first channel bank; and
    the communication network further comprises a second channel bank for coupling the D-channels to the switch and a high-speed link carrying a plurality of the communication channels of the transport fabric between the first and second channel banks, the plurality of channels including the channel assigned to the digital subscriber line and said another communication channel.

16. A communication network as in claim 15, wherein the high-speed link comprises at least one T1 link.

17. A communication network as in claim 16, wherein the channel banks comprise D4 channel banks.

18. A communication network as in claim 13, wherein said at least one switch for voice-grade telephone services comprises a switch selected from the group consisting of: a telephone central office switch, a packet switch and an asynchronous transfer mode (ATM) switch.

19. A communication network as in claim 13, wherein the transport fabric further includes a switch for data communications, and the communication channel assigned to the digital subscriber line in the transport fabric is coupled to the switch for data communications.

20. A digital carrier system for digital transport of communication signals between a digital subscriber line and at least one network switch, the digital carrier system comprising:
    a first channel bank, the first channel bank comprising:

(a) a line card for connection to a digital subscriber line, the line card supporting a bearer communication channel and a logically separate signaling data (D) channel on the digital subscriber line, the line card providing throughput between the bearer communication channel and a first assigned communication channel and providing a coupling for the D channel, and (b) a multiplexer coupled to the D channel coupling of the line card for multiplexing and demultiplexing to enable transport of the D channel information together with D channel information of another line in a second assigned communication channel;

a high speed data link coupled to the first channel bank for carrying a plurality of communication channels to and from the first channel bank, including the first and second assigned communication channels; and a second channel bank coupled to the high speed data link, the second channel bank passing the first assigned channel through between the high speed data link and a port for connection to a data communications switch, the second channel bank comprising:

(i) a second multiplexer coupled to the second assigned channel within the high speed data link for multiplexing and demultiplexing the D-channel information of the lines, and (ii) an interface for coupling the D-channel information of the digital subscriber line between the second multiplexer and a switch for voice grade telephone service.

21. A digital carrier system as in claim 20, wherein the interface comprises a digital coder decoder (CODEC).

22. A digital carrier system as in claim 20, wherein the multiplexers combine and segregate D channel information to allow transport of up to four D channel streams over the second assigned channel.

23. A digital carrier system as in claim 22, wherein the first assigned channel comprises sufficient channel capacity for transport of two bearer (B) channels on the digital subscriber line, and the second assigned channel has capacity substantially corresponding to one bearer (B) channel.

\* \* \* \* \*